June 1, 1937.  E. L. FISCHER  2,082,539
FLOW METER
Filed March 15, 1933
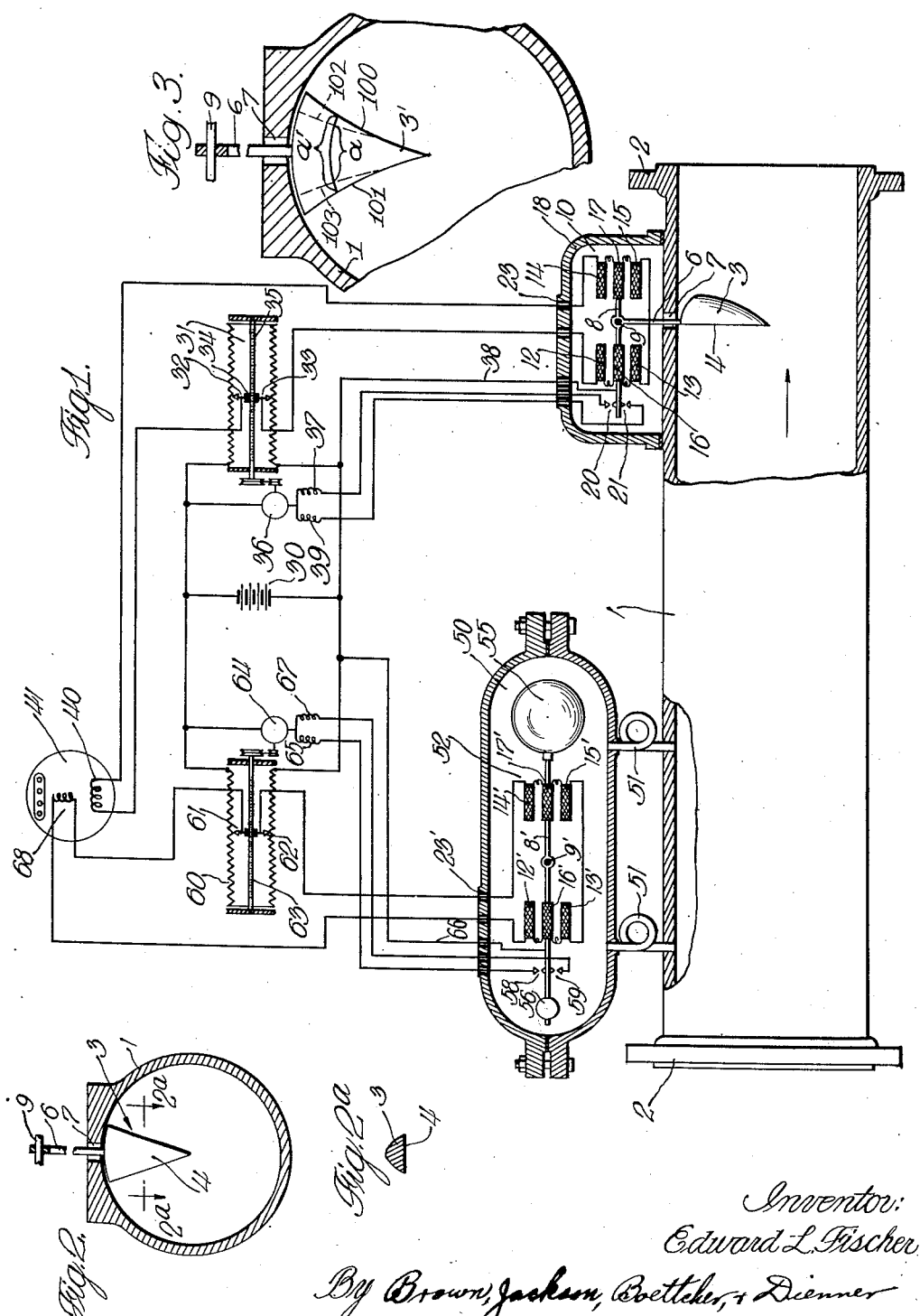
Inventor:
Edward L. Fischer
By Brown, Jackson, Boettcher, + Dienner
Attys.

Patented June 1, 1937

2,082,539

UNITED STATES PATENT OFFICE 2,082,539

FLOW METER

Edward Lee Fischer, Davenport, Iowa

Application March 15, 1933, Serial No. 660,822

2 Claims. (Cl. 73—228)

This invention relates to the measurement of fluid flow through a pipe, trough or the like and is particularly concerned with the measurement of the weight of fluid flowing, rather than the volume of flow.

In the measurement of fluids that are subject to variation in density, such as gases, it has been customary to measure the temperature and the pressure for determining the density. Such methods are open to objections. In cases where the composition of the fluid flowing through a pipe varies from time to time the resulting changes in density can not be determined from changes in temperature or pressure.

It is an object of the present invention to provide a vane to be used in fluid flow measuring means wherein the density is measured directly, so as to detect any changes in density regardless of how the changes were caused.

It is a still further object of the present invention to provide a vane to be used in an apparatus the calibration of which is independent of the density of the fluid to be measured, so that the instrument, once calibrated, will be accurate for various fluids. In those instruments of the past, with which I am familiar, the calibration was always for the particular fluid which the instrument was to measure. The readings of an instrument that had been calibrated for one fluid were not correct for a different fluid. By my present invention the calibration is the same, within limits, regardless of the fluid to be measured.

Before giving a description of a specific exemplification of the present invention it may be well to consider some of the principles involved. Consider a gas of a density of "$d$" pounds per cubic foot at the temperature and pressure conditions prevailing at the time the measurement is being made. Assume that it is flowing through a pipe of area "$A$" square feet, at an average velocity of "$V$" feet per unit time. The quantity of gas "$Q$" in pounds per unit of time is equal to the velocity in feet per unit time, times the cross-sectional area in square feet, times the weight per cubic foot, in pounds "$d$", or—

$$Q = A\, d\, V \qquad (1)$$

If the pressure "$P_0$" be changed to "$P_1$" and the temperature "$T_0$" be changed to "$T_1$" then the original density "$d$" is changed to "$d_1$" which, according to Boyles and Charles laws is directly proportional to the absolute pressure and inversely proportional to the absolute temperature.

Thus $$d_1 = \frac{dP_1T_0}{P_0T_1}$$

Assume the rate of flow in cubic feet per hour, corrected, to remain unchanged.

The volume of the gas at flowing temperature "$T_0$" and pressure "$P_0$" is $AV$. This volume will change to $AV_1$ if pressure and temperature are changed and the new volume $AV_1$ will be, according to Boyles and Charles laws, inversely proportional to the absolute pressure and directly proportional to the absolute temperature.

Thus $$AV_1 = \frac{AVP_0T_1}{P_1T_0}$$

or $$V_1 = \frac{VP_0T_1}{P_1T_0}$$

The quantity in pounds under the new conditions will be:

$$Q = Ad_1V_1$$

Substituting the above values of $d_1$ and $V_1$ in the above equation we have—

$$Q_1 = A\left(\frac{dP_1T_0}{P_0T_1}\right)\left(\frac{VP_0T_1}{P_1T_0}\right)$$

or $$Q = AdV$$

But $Q$ (from Equation (1)) $= AdV$, therefore $Q_1 = Q$, so we may write—

$$Q = Ad_1V_1$$

Therefore the quantity in pounds is independent of varying pressures and temperatures and is always proportional to the product of the density and velocity at flowing conditions.

The above demonstration is unnecessary, since the Equation (1) is fundamentally true for any values of "$d$" and "$V$", but has been inserted here to show that strictly in accordance with Boyles and Charles laws, temperatures and pressures may be omitted.

Since Equation (1) is true in accordance with and also independent of Boyles and Charles laws, then it is true for gasses or liquids not following these laws and is therefore not subject to error caused by super-compressibility or deviation from Boyles laws.

If we desire the volume of gas or liquid corrected to any given conditions of pressure and temperature we have only to divide "$Q$" by the density of the gas or liquid at those given conditions and the true volume, corrected to the given conditions, will result, independent of the temperature or pressure at flowing conditions or the characteristics of the particular gas or liquid considered as to compressibility or volume changes due to temperature.

The velocity of a gas or liquid flowing in a pipe, liquid being assumed to fill the entire pipe, is not uniform throughout the entire cross sectional area of the pipe, but we may safely assume that if the pipe have a uniformly smooth interior surface, and a true circle, the velocity at all points equi-distant from the center will be equal.

If we insert in the flow a flat surface placed perpendicular to the stream lines the surface will at all points have a force or pressure exerted on it equal to $1/2 MV^2$, M being the mass of the gas or liquid and V the velocity at the particular point in question. The total force exerted on the flat surface will be the sum of all the forces at the various points, or $$\frac{A_1 M V_1^2}{2}$$

where $V_1$ represents the weighted average velocity over the area, and $A_1$ the area of flat surface.

Since A represents the cross sectional area of the pipe, the proportion of the area represented by all points equi-distant "r" from the center is $2\pi r$, and if we shape the flat surface above referred to so that at any distance from the center it bears the same relation to $2\pi r$ that the total area $A_1$ bears to A, then the force $$\frac{A_1 M V_1^2}{2}$$

is truly proportional to the force which would result over the entire area if we summarized all the forces acting over the total area A, or $V_1$ represents the true weighted average velocity of the gas over the total area A. It follows that the portion of area to be placed r distance from the center should be $$\frac{2A_1 \pi r}{A},$$

or the shape of the area $A_1$ is a sector of the pipe circle.

The force "F", in pounds per square foot, that is exerted on the surface by the moving stream, is $$F = \frac{dV^2}{2G}$$

where G is the gravitational acceleration.

The total force on the surface is the product of the above force and the area of the surface, or $$F_1 = \frac{A_1 d V^2}{2G}$$

from which we can derive the value of V as $$V = \sqrt{\frac{2 G F_1}{A_1 d}}$$

Since $$\frac{2G}{A_1}$$

is a constant, we can write this equation as $$V = K \sqrt{\frac{F_1}{d}}$$

Substituting this value of V in Equation (1) we get $$Q = A d K \sqrt{\frac{F_1}{d}} = A K \sqrt{F_1 d}$$

Since the area of the pipe is a constant, we may write this equation $$Q = K_1 \sqrt{F_1 d} \qquad (2)$$

If the gas or liquid at flowing condition be led into a chamber where there is no movement we can obtain its density. If a sphere of rigid material of zero temperature coefficient be balanced against gravity in a vacuum the buoyancy effect "B" of the gas or liquid surrounding the sphere can be measured on the balance and it will be equal to the volume of the sphere in cubic feet times the density of the gas or liquid in pounds per cubic foot.

The buoyancy, B, in pounds, is equal to the density of the gas in pounds per cubic foot times the volume of the sphere in cubic feet. Since this volume is a constant, $B = d K_2$, from which we can get $$d = \frac{B}{K_2}$$

substituting this value in Equation (2) we get $$Q = K_1 \sqrt{\frac{F_1 B}{K_2}}$$

or $$Q = K_3 \sqrt{F_1 B} \qquad (3)$$

If the forces F and B be measured, observed, and combined in the relation expressed in Equation (3), we have a flow meter reading directly in pounds of gas or liquid per hour, and if this be used in an instrument to draw a line against time, the integration of the line against time will be a measure of the pounds of gas passed in a given time.

One way of accomplishing this in a single instrument is to balance the forces F and B by means of Kelvin balances.

Balance the force F by a Kelvin balance arranged so the pull of the balance will be proportional to the current squared, or $F = K_4 I^2$ in which "I" represents the current in the coils of the balance.

Balance the force B by a Kelvin balance arranged so the pull will be proportional to the voltage across the coils squared or $B = K_5 E^2$ in which "E" represents the voltage across the coils of the balance.

Substituting these values of F and B in (3) we have—

$$Q = K_3 \sqrt{(K_4 I^2)(K_5 E^2)}$$

or, since $K_3$, $K_4$ and $K_5$ are constants $$Q = K_6 E I \qquad (4)$$

Now if we impress the voltage "E" on a wattmeter and pass the current "I" through the wattmeter the wattmeter will indicate equal to the product of E and I, so $$Q = K_6 W \qquad (5)$$

where "W" represents watts, or the product of E and I.

Since a watt-hour meter integrates watts and time, if we put the voltage and current into a watt-hour meter the registration of the meter will be proportional to the quantity of gas passed in the time between readings. If, therefore, we properly design the watt-hour meter we may cause it to register directly the pounds of gas passed during any period.

Having thus explained the general principles on which the present invention is based, a description will now be given of a few specific embodiments of the invention, from which the attainment of the above, and other objects of the invention, will be apparent. For this purpose reference may be had to the drawing, wherein:

Figure 1 is a diagrammatic representation of one embodiment of the present invention;

Figure 2 is an elevational view of the impact vane of Figure 1;

Figure 2A is a sectional view of the impact vane, said view being taken along the line 2a—2a of Figure 2;

Figure 3 is a side view of a modified form of vane which may be used in the apparatus shown in Figure 1.

Reference may now be had more particularly to Figure 1.

At 1 there is indicated a short tube or pipe through which the vapor, gas, steam, or liquid to be metered is passing. This pipe or tube is provided with flanges 2—2 whereby it may be connected in the piping system. The pipe 1 may be made relatively short. A vane 3 is located within the pipe, with its surface 4 perpendicular to the streamline of flow. The vane 3 extends from the center of the pipe to the periphery thereof, being widest at the outer periphery of the pipe and tapering to a point at the center of the pipe. The surface of the vane is purposely flat in the front, while the rear surface is, preferably, streamlined to prevent the creation of a vacuum at the rear of the vane 3 by the flowing fluid. As may be seen from Figure 2, the front of the vane is of the shape of a sector of a circle of the diameter of the pipe 1. The vane 3 is secured to an arm 6 that extends through a small opening 7 in the pipe 1 and is secured to the movable element 8 of a Kelvin balance 10. The fulcrum about which the movable element 8 and the arm 6 swing, is indicated at 9. The stationary coils of the Kelvin balance are indicated at 12, 13, 14 and 15, whereas the movable coils, which are carried by the movable element 8, are indicated at 16 and 17. The balance is contained within a casing 18, of metal or the like, which is attached to the pipe 1 in any desired manner, so as to form a gas-tight seal therewith. By this arrangement the casing 18 may be filled with the fluid that flows through the pipe 1. A set of contacts 20 and 21 are adapted to be closed when the movable element of the balance swings in one direction or the other from its neutral, or balanced position. These contacts may be of any preferred construction, and may comprise a three-point mercury switch, arranged so that the mercury will close one or the other set of contacts when the movable element of the balance swings in one direction or the other from its neutral position. The vane 3 is not attached to the pipe, but is free to move therein about the fulcrum 9 to move, or be moved by, the movable element of the Kelvin balance. The conductors that establish the circuit to the coils of the balance, and to the contacts 20 and 21, are extended into the casing 18 through insulated bushings 23 which form a gas-tight connection between the casing and the conductors.

The current for the Kelvin balance 10 is supplied by a battery 30, or any other suitable source of constant potential, through a resistance 31 of the potentiometer type, having sliding contacts 32—33 carried on an insulating member 34, which is adapted to be moved by a screw 35 driven by a reversible motor 36 under the control of the contacts 20 and 21 of the Kelvin balance 10. When the contacts 20 and 21 are open the motor is at rest. When the equilibrium of the movable element of the Kelvin balance is disturbed, so as to close the contacts 20, a circuit is established for the motor 36 through the field 37 and the return conductor 38. This produces rotation of the motor in one direction, whereby the slider 34 is moved so as to vary the current flowing through the coils 12, 13, 14, 15, 16 and 17, which are connected in series, so as to vary the force on the movable coils 16 and 17 in such a manner as to restore equilibrium. When balance is restored, and the contacts 20 open, the motor 36 comes to rest. If the equilibrium of the balance is disturbed in the opposite direction, so that the contacts 21 close, there is established a circuit for the motor 36 by way of the field 39 and the contacts 21 to the return wire 38. This produces a reverse rotation of the motor 36 and a reverse movement of the slider 34. Current flows from the battery 30, through the variable resistance 31, and the six coils of the Kelvin balance, in series with a coil 40 of an instrument 41. The instrument 41 may be a watt meter or, preferably, a watt-hour meter, the coil 40 constituting the current coil of the instrument. It is thus apparent that the current flowing through the coil 40 of the meter 41 will be determined by the setting of the potentiometer rheostat 31, which setting is, in turn, determined by the amount of current necessary to maintain the movable element 8 of the Kelvin balance in its exactly balanced position.

At the opposite end of the pipe 1, I provide means for measuring the density of the fluid within the pipe. This means comprises a fluid-tight casing 50, communicating with the interior of the pipe 1 through one or more tubes 51—51 and sealed against the escape of fluid therefrom to the atmosphere. A Kelvin balance 52, of a construction similar to the Kelvin balance 10, is mounted within the casing 50. The stationary coils of this balance are indicated at 12' through 15' and the movable coils thereof at 16' and 17', all of the coils being connected in series. The movable arm 8' of this balance carries, at one end, a large hollow sphere 55, which is of light, rigid material and sealed against communication with the fluid within the casing 50. At its opposite end, the movable arm 8' is counterbalanced by a small, compact weight 56, of a mass exactly equal to the mass of the sphere 55. The sphere 55 thus constitutes a float which tends to rise if the density of the fluid within the casing 50 increases, and to fall if the density of the fluid within the casing 50 decreases. The Kelvin balance 52 is provided with contacts 58 and 59, similar to the contacts 20 and 21. The connections to the contacts and the coils of the balance are extended into the casing 50 through insulating bushings 23' which form a fluid-tight seal to prevent the entrance or escape of fluid at those points.

The coils of the Kelvin balance 52 are supplied with current from the battery 30 through a potentiometer 60, of a construction similar to the potentiometer 31, and provided with sliding contacts 61 and 62 which are adapted to be moved along the potentiometer by a worm 63 driven by a motor 64. When the balance arm 8' is in its mid-position the contacts 58 and 59 are open and the motor 64 is at rest. If the balance of the arm 8' is upset so that the contacts 58 close, there is established a circuit for the motor by way of its field winding 65 and return conductor 66, whereby the motor moves the contacts 61—62 to vary the potential applied to the coils of the balance to restore equilibrium. If the balance had been upset in such a direction as to cause the contacts 59 to close, the motor circuit would have been completed by way of its field 67 and the return conductor 66, so that the motor would operate in the reverse direction, to bring about a balanced condition of the arm 8' of the Kelvin balance 52. The coils of the Kelvin balance are connected in series with a coil 68 of the meter 41, and supplied with a varying potential determined by the setting of the contacts 61—62. The coil 68 of the meter 41 may constitute the voltage coil of the watt-meter or of the watt-hour meter.

The operation of the device thus far described is as follows. The fluid moving through the pipe 1 in the direction indicated by the arrow, strikes against the vane 3 and exerts a force thereon which tends to move it in the direction of flow. This force is proportional to the product of the density of the fluid material, the square of the velocity of flow, and the area of the vane. This force moves the vane about the fulcrum 9 and thus moves the movable element 8 of the Kelvin balance counterclockwise to close the contacts 21. This completes a circuit for the motor by way of its field winding 39. The motor 36 rotates in such a direction as to move the contacts 32—33 in the proper direction to increase the voltage between them, that is, to the left as seen in Figure 1. This causes greater current to flow between the points 32—33 by way of the coil element 40 and the six coils of the Kelvin balance. The coils of the Kelvin balance are connected so that the magnetic attraction between them will be in such direction as to oppose the force exerted on the vane 3. The motor 36 will continue to rotate until the force of the coils equals the force exerted on the vane, when the contacts 21 will separate and the motor will stop. If the rate of fluid flow is reduced, or if the density of the fluid is reduced, the magnetic forces between the coils of the Kelvin balance 10 will predominate, and the balance will move so that the contacts 20 close, causing the motor 36 to rotate in the opposite direction, to move the contacts 32—33 to the right, that is, in a direction to decrease the voltage between them, thus reducing the current through the six coils of the balance. When this current has been reduced to such an amount that the magnetic force between the coils of the balance again equals the force exerted on the vane 3 by the moving stream, the element 8 of the balance will again be restored to its neutral position, thus opening the contacts 20 and stopping the motor. Thus the magnetic forces exerted between the stationary and the movable coils of the balance will be at all times maintained by the rheostat 31, the motor 36, and the contacts 20—21, so that they equal the force exerted on the vane 3. The inherent law of action of a Kelvin balance, as is well known, is such that the magnetic forces between the stationary and the movable coils will, at all times, be proportional to the square of the current flowing through the coils. Therefore, the current through the coils of the Kelvin balance will, at all times, be proportional to the square root of the force exerted on the vane 3. But this force is proportional to the product of the density of the fluid flowing through the pipe, and the square of its velocity, since the surface area of the vane is a constant. Therefore, the product of the density of the fluid flowing through the pipe 1, and the square of the velocity of flow, must be, at all times, proportional to the square of the current flowing through the coils of the balance. If "C" represents the constant of the relationship between these two forces, then $$I^2 = CV^2 d$$

or $$I = (\sqrt{C}\, V\sqrt{d})$$

The Kelvin balance 52 is so adjusted that the torque due to gravity only will be balanced about the fulcrum 9'. When this balance is in a gaseous or liquid material, a buoyancy force will be exerted on the sphere 55, acting against gravity. This force will be proportional to the density of the fluid material and to the volumetric displacement of the movable parts of the balance. The weight 56 is of small volume in comparison with the volume of the sphere 55, and since the other parts of the balance are of equal displacement on the two sides of the fulcrum 9', the buoyancy force upward on the sphere 55 will exceed the buoyancy force upward on the weight 56 by the fixed difference in volume between the sphere 55 and the weight 56. This buoyancy force will cause the sphere 55 to rise, thus closing the contacts 59. This completes a circuit for the motor 64, by way of its field winding 67, whereby this motor moves the contacts 61—62 so as to increase the potential between them, that is, in a direction to the right as seen in Figure 1. This increases the magnetic force between the stationary and the movable coils of the balance, which increase continues until the magnetic force is equal to the force of buoyancy on the sphere 55. When the two forces become equal the balance is restored and the contacts 59 open, thus opening the motor circuit. Since the volume of the sphere 55 is a constant, the force on the sphere 55 is proportional to the density of the fluid material within the casing 50, which is the same as the material flowing in the pipe 1. If the density of the fluid should decrease, the magnetic force due to the current flowing through the coils of the Kelvin balance will predominate over the force of buoyancy and cause a closure of the contacts 58 to operate the motor 64 in its opposite direction to decrease the current flowing through the coils of the balance until the forces are again equalized. It is therefore apparent that the magnetic forces will be at all times proportionate to the buoyancy of the fluid on the sphere 55, which is proportionate to the density of the fluid. Since the magnetic forces are proportionate to the square of the current flowing through the Kelvin balance 52, it follows that the square of this current is proportionate to the density, or the current is proportionate to the square root of the density. Thus we may write the equation—

$$I_1 = C_1\sqrt{d}$$

where $I_1$ is the current flowing through the coils of the balance 52.

The meter 41, if it is a watt meter, will give a reading which is proportionate to the product of the currents flowing through the coils 40 and 68. Multiplying the values of "I" and "$I_1$", as given above, we get a reading "R" which is proportionate to the velocity times the density. If the pipe is flowing full, the cross sectional area of the pipe is a constant, and therefore the product of the velocity and the density will be proportionate to the weight of fluid flowing through the pipe per unit time.

If the meter 41 is a watt-hour meter its movable element will rotate at a speed which is proportionate to the product of the currents flowing through the coils 40 and 68.

Since the speed of rotation will be proportionate to the rate of flow, in pounds per unit time, the total number of revolutions for any given period of time will be proportionate to the total flow, in pounds, during that period.

By properly calibrating the instrument 41 the factor of proportionality may be taken into consideration so that the meter will read directly in pounds per second, or per minute, or per hour, in the case of a watt-meter, or in terms of total pounds of flow in the case of a watt-hour meter.

It will be noted that in the general statement of the principles of the present invention I have used voltage as a measure of density whereas, in the description of Figure 1, I have used amperage. Either can be used, since the current flowing through the circuit including the coils of the Kelvin balance 52 and the winding 68 of the meter 41 is always proportionate to the potential between the contacts 61—62. The use of amperage is preferred, as it eliminates errors due to resistance changes caused by temperature changes.

In Figure 3 I have illustrated a modified form of vane. This vane, as in the case of the vane 3, extends from the inner periphery of the pipe to the center of the pipe, being widest at its outer periphery, and tapering to a point at the center of the pipe. The edges 100 and 101 of this vane are not straight lines, as in the case of Figure 2, being, instead, similar curves. The dotted lines 102 and 103 are radii tangential to the curves at the center of the pipe and are drawn to illustrate the extent to which the curves 100 and 101 deviate from the radii. This is the extent to which the front face of the vane deviates from a true sector of a circle. It is to be noted that this deviation increases at increased distances from the center of the pipe. As a result of the increase in the angular distance between the edges 100 and 101 the force of impact of the moving stream at increased distances from the center of the pipe is increased over and above the increase that should result by reason of the greater radius. This will compensate for the smaller leverages through which the forces at the greater radii act. The forces at different points on the vane act through leverages which are equal to the effective distance of those points from the fulcrum 9. Since those points that are further from the center of the pipe are closer to the fulcrum 9, they act through a smaller leverage, and there is a possibility of error due to this difference. This error, while small, may be compensated for by increasing the angular distance between the edges 100—101 of the vane at increasing distances from the center of the pipe. This increase in angular distance should be of such an amount as to compensate for the decrease in leverage. If "$a$" is the angle, in radians, between the dotted lines 102 and 103, and "$h$" is the distance, in feet, from the center of the pipe to the fulcrum 9, then the increase in angularity between the curves 100—101 and the radii 102—103, at any distance, "$r$" feet should be $$\frac{ra}{h-r}$$

so that the total angle "$a_1$", in radians, between the curves 100 and 101, at any distance "$r$" from the center of the pipe is $$a_1 = a + \frac{ra}{h-r}$$

The length of an arc "$c$", at any distance "$r$" feet from the center is $$c = r\left(a + \frac{ra}{h-r}\right)$$

A force on the arc "$c$" acts through a leverage "$h-r$", so that a force of "$F$" pounds per unit length of arc produces a moment "$M$" tending to turn the vane about the fulcrum 9, which moment is equal to:

$$M = F(c)(h-r) = F(r)\left(a + \frac{ra}{h-r}\right)(h-r)$$

or $$M = F(r)(a)(h)$$

Since "$a$" may be any fixed angle, the product of this angle by its radius is, as was previously shown, proportionate to the circumference of a circle of radius "$r$".

This means that the moment at any distance "$r$" is proportionate to the product of a fixed length "$h$" and the circumference of a circle of radius "$r$". In the case of a sector this moment is the product of a variable "$h-r$" and the circumference of a circle of radius "$r$". From the above discussion it may also be seen that the width of the vane 3' along an arc of any radius, about the center of the pipe as a center, times the distance of that arc to the fulcrum 9, is proportionate to the radius about which the arc is drawn.

In compliance with the requirements of the patent statutes, herein shown and described are a few preferred embodiments of my invention. It is to be understood, however, that the invention is not limited to the precise construction herein taught, the same being merely illustrative of the principles of the invention.

What I consider new and desire to secure by Letters Patent is:

1. Means for measuring fluid flow in a pipe, comprising a narrow impact vane extending from substantially the center of the pipe to substantially the inner periphery thereof, and of a width varying substantially in proportion to the distance from a line of measured width to the center of the pipe.

2. Means for measuring fluid flow in a pipe, comprising a narrow impact vane within the pipe and pivoted about a pivot outside of the pipe, the vane being of a varying width such that the product of the width at any distance from the center of the pipe and the distance from the point of measurement of width to the pivot, is proportionate to the distance from the line of measured width to the center of the pipe.

EDWARD LEE FISCHER.